US010643157B2

(12) United States Patent
De et al.

(10) Patent No.: US 10,643,157 B2
(45) Date of Patent: May 5, 2020

(54) TASK PROGRESS UPDATE HISTORY VISUALIZATION SYSTEM

(71) Applicant: Oracle International Corporation, Redwood Shores, CA (US)

(72) Inventors: Niladri De, Hyderabad (IN); Srinivasu Dudala, Hyderabad (IN); Mani Kumar Vran Kasibhatla, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 654 days.

(21) Appl. No.: 14/612,322

(22) Filed: Feb. 3, 2015

(65) Prior Publication Data

US 2016/0224928 A1    Aug. 4, 2016

(51) Int. Cl.
*G06Q 10/06* (2012.01)
(52) U.S. Cl.
CPC ........................... *G06Q 10/063114* (2013.01)
(58) Field of Classification Search
USPC ............................................... 705/7.11–7.42
See application file for complete search history.

(56) References Cited

U.S. PATENT DOCUMENTS

| 5,737,728 | A | 4/1998 | Sisley et al. |
| 5,745,110 | A | 4/1998 | Ertemalp |
| 6,115,640 | A | 9/2000 | Tarumi |
| 6,211,856 | B1 | 4/2001 | Choi et al. |
| 6,707,903 | B2 | 3/2004 | Burok et al. |
| 6,854,088 | B2 * | 2/2005 | Massengale .......... G06F 3/0481 715/764 |
| 6,920,632 | B2 | 7/2005 | Donovan et al. |
| 7,092,929 | B1 | 8/2006 | Dvorak et al. |
| 7,159,206 | B1 * | 1/2007 | Sadhu ..................... G06Q 10/06 717/101 |
| 7,406,432 | B1 | 7/2008 | Motoyama |

(Continued)

FOREIGN PATENT DOCUMENTS

| CN | 102306162 A | 1/2012 |
| EP | 1026609 A2 | 8/2000 |

(Continued)

OTHER PUBLICATIONS

Myers, Brad, "The importance of percent-done progress indicators for computer-human interfaces", ACM SIGCHI Bulletin, Apr. 1985, vol. 16, Issue 4, pp. 11-17. (Year: 1985).*

(Continued)

*Primary Examiner* — Amber A Misiaszek
(74) *Attorney, Agent, or Firm* — Potomac Law Group, PLLC

(57) ABSTRACT

A system is provided that visualizes task progress update history. The system displays a project plan timeline within a user interface, where the project plan timeline includes tasks indicators that visually represent tasks and a timeline including time unit indicators that visually represent time units. The system further displaying task progress update history within the project plan timeline, where the task progress update history includes task progress update indicators that visually represent task progress updates, and where a task progress update indicator visually indicates a date-time of a task progress update and a task progress reported by the task progress update.

20 Claims, 3 Drawing Sheets

(56) References Cited

U.S. PATENT DOCUMENTS

| | | | |
|---|---|---|---|
| 7,536,313 B2 | 5/2009 | Motoyama | |
| 7,688,322 B2 | 3/2010 | Kapler et al. | |
| 7,912,746 B2 | 3/2011 | Kline et al. | |
| 7,921,026 B2 | 4/2011 | O'Cull et al. | |
| 8,099,312 B2 | 1/2012 | Jin et al. | |
| 8,160,911 B2 | 4/2012 | Lau et al. | |
| 8,224,472 B1 | 7/2012 | Maluf et al. | |
| 8,286,103 B2 | 10/2012 | Chaudhri et al. | |
| 8,433,632 B2 | 4/2013 | Sankaran et al. | |
| 8,544,011 B2 | 9/2013 | Tanikawa | |
| 8,776,008 B2 | 7/2014 | Kapoor et al. | |
| 2003/0038831 A1* | 2/2003 | Engelfriet | G06F 15/0266 715/719 |
| 2003/0061266 A1 | 3/2003 | Ouchi | |
| 2003/0137541 A1* | 7/2003 | Massengale | G06F 3/0481 715/764 |
| 2003/0149717 A1 | 8/2003 | Heinzman | |
| 2005/0149370 A1 | 7/2005 | Brown | |
| 2005/0165631 A1 | 7/2005 | Horvitz | |
| 2005/0198103 A1 | 9/2005 | Ching | |
| 2005/0229151 A1 | 10/2005 | Gupta et al. | |
| 2005/0289013 A1 | 12/2005 | Goldberg | |
| 2006/0004618 A1 | 1/2006 | Brixius | |
| 2006/0212325 A1 | 9/2006 | Levanon | |
| 2006/0277487 A1 | 12/2006 | Poulsen et al. | |
| 2007/0073575 A1 | 3/2007 | Yomogida | |
| 2007/0150327 A1 | 6/2007 | Dromgold | |
| 2007/0192748 A1 | 8/2007 | Martin et al. | |
| 2007/0233534 A1 | 10/2007 | Martin et al. | |
| 2007/0245300 A1 | 10/2007 | Chan et al. | |
| 2008/0027776 A1 | 1/2008 | Sourov et al. | |
| 2008/0103871 A1 | 5/2008 | Ruehl et al. | |
| 2008/0126114 A1 | 5/2008 | McClure | |
| 2008/0155433 A1 | 6/2008 | Robertson et al. | |
| 2008/0215409 A1 | 9/2008 | Matre | |
| 2008/0221946 A1 | 9/2008 | Balon | |
| 2008/0301698 A1 | 12/2008 | Badaloo et al. | |
| 2009/0133027 A1 | 5/2009 | Gunning et al. | |
| 2009/0158293 A1 | 6/2009 | Kajihara | |
| 2009/0198540 A1 | 8/2009 | Kienzle et al. | |
| 2009/0216602 A1 | 8/2009 | Henderson | |
| 2009/0234699 A1 | 9/2009 | Steinglass et al. | |
| 2009/0320019 A1 | 12/2009 | Ellington et al. | |
| 2010/0010856 A1 | 1/2010 | Chua et al. | |
| 2010/0257015 A1 | 10/2010 | Molander | |
| 2011/0107256 A1 | 5/2011 | Robertson et al. | |
| 2011/0216067 A1 | 9/2011 | Schorr et al. | |
| 2011/0271220 A1 | 11/2011 | Remsberg et al. | |
| 2011/0276351 A1 | 11/2011 | Kondo et al. | |
| 2011/0283285 A1 | 11/2011 | Saad et al. | |
| 2012/0079403 A1 | 3/2012 | Schorr et al. | |
| 2012/0130907 A1 | 5/2012 | Thompson et al. | |
| 2012/0278118 A1 | 11/2012 | Araki et al. | |
| 2013/0120239 A1 | 5/2013 | Suzuki et al. | |
| 2013/0132334 A1 | 5/2013 | Reisdorf | |
| 2013/0144679 A1 | 6/2013 | Burnett et al. | |
| 2013/0325763 A1 | 12/2013 | Cantor et al. | |
| 2014/0032257 A1 | 1/2014 | Houle | |
| 2014/0058786 A1 | 2/2014 | Marquet | |
| 2014/0122144 A1 | 5/2014 | Cirpus et al. | |
| 2014/0229212 A1 | 8/2014 | MacElheron et al. | |
| 2014/0244334 A1 | 8/2014 | De et al. | |
| 2014/0278690 A1 | 9/2014 | Agarwal et al. | |
| 2015/0007058 A1 | 1/2015 | Wooten | |
| 2015/0324190 A1 | 11/2015 | Ledbrook | |

FOREIGN PATENT DOCUMENTS

| | | | |
|---|---|---|---|
| EP | 1061443 A2 | 12/2000 | |
| JP | 2000194469 A | 7/2000 | |
| JP | 2012079200 A | 4/2012 | |
| JP | 2013105310 A | 5/2013 | |
| JP | 2013127821 A | 6/2013 | |
| WO | 1994016397 | 7/1994 | |
| WO | 2001018683 A2 | 3/2001 | |
| WO | 20040102431 A1 | 11/2004 | |
| WO | 2009055425 A1 | 4/2009 | |
| WO | 2012092556 A2 | 7/2012 | |
| WO | 20130100902 A1 | 7/2013 | |
| WO | 20130162572 A1 | 10/2013 | |

OTHER PUBLICATIONS

Ragnar Bade et al., "Connecting time-oriented data and informatin to a coherent interactive visualization", Proceedings of the 2004 Conference on Human Factors in Computing Systems, CHI '04, Jan. 1, 2004, pp. 105-112, XP055138586.

Mike Gunderloy, Performing Drag-and-Drop Operations, Microsoft, Feb. 2002, https://msdn.microsoft.com/en-us/library/ms973845.aspx, p. 1-7.

Daniel D. Suthers, "An Analysis of Explanation and Its Implications for the Design of Explanation Planners", Computer Science, Feb. 1993, ftp://ftp.pitt.edu/dept/lrdc/edtech/suthers/suthers-thesis-full.pdf, last downloaded Mar. 5, 2014.

Charlotte Russe, "BOARD delivers Budgeting and Planning Applications for Charlotte Russe", http://www.board.com/downloads/1en_CharlotteRusse.pdf, last downloaded Mar. 5, 2014.

Constraints and Dependencies—Gantt Charts Online—Gantto.com, http://gantto.com/support/documentation/constraints-and-dependencies/?overlay=false, last downloaded Mar. 5, 2014.

Stephen Sloan et al., "CPM and GANTT: The Next Step in Multi-Project Management", http://www.nesug.org/Proceedings/nesug12/ma/ma07.pdf, last downloaded Mar. 5, 2014.

Distribute project work evenly (level resource assignments), http://office.microsoft.com/en-in/project-help/distribute-project-work-evenly-level-resource-assignments-HA001231647.aspx, last downloaded Mar. 5, 2014.

Agata Czamigowska, "Earned value method as a tool for project control", Budownictwo i Architektura 3 (2008) 15-32, http://yadda.icm.edu.pl/baztech/element/bwmeta1.element.baztech-article-BPL6-0014-0070/c/httpwibis_pollub_plfilesplikikonferencje32.pdf, last downloaded Mar. 5, 2014.

Bonnie Biafore, "Fast-track tasks to shorten your project schedule—Project—Office.com", http://office.microsoft.com/en-in/project-help/fast-track-tasks-to-shorten-your-project-schedule-HA010036399.aspx, last downloaded Mar. 5, 2014.

Features: Task Management, Zilicus PM Project planing & collaboration software, http://www.zilicus.com/features/task-management.html, last downloaded Mar. 5, 2014.

Danny Holten, "Hierarchical Edge Bundles: Visualization of Adjacency Relations in Hierarchical Data", IEEE Transactions on Visualization and Computer Graphics, vol. 12, No. 5, Sep./Oct. 2006, http://www.win.tue.nl/~dholten/papers/bundles_infovis.pdf, last downloaded Mar. 5, 2014.

How to Create Project Schedule Part II, Elementool Project Management Blog, http://www.elementool.com/blog/?p=238, last downloaded Mar. 5, 2014.

Zhenhua Guo et al., "Improving Resource Utilization in MapReduce", School of Informatics and Computing, Indiana University, US, http://grids.ucs.indiana.edu/ptliupages/publications/Improve_Resource_Utilization_MapReduce_V8.pdf, last downloaded Mar. 5, 2014.

Microsoft Project—Project Management Features, http://office.microsoft.com/en-us/project/project-management-and-ppm-showcase-microsoft-project-FX103802304.aspx, last downloaded Mar. 5. 2014.

Microsoft Project—Project Portfolio Management Features, http://office.microsoft.com/en-us/project/project-management-and-ppm-showcase-microsoft-project-FX103802304.aspx, last downloaded Mar. 5, 2014.

Download Microsoft Project for the masses from Official Microsoft Download Centre, "Microsoft Project for the masses", http://www.microsoft.com/en-in/download/details.aspx?id=25194, last downloaded Mar. 5, 2014.

Project Management Software—Quick Tour, "MinuteMan Systems", http://www.minuteman-systems.com/QuickTour.htm, last downloaded Mar. 5, 2014.

(56) References Cited

OTHER PUBLICATIONS

Oracle Primavera, Oracle Data Sheet, "Oracle's Primavera P6 Enterprise Project Portfolio Management", Copyright 2013.
OmniPlan, version 2.0.1 Manual, http://downloads2.omnigroup.com/software/MacOSX/Manuals/OmniPlan-2-Manual.pdf, last downloaded Mar. 5, 2014.
Wolfgang Wahlster et al., "Plan-based Integration of Natural Language and Graphics Generation", Jan. 1993, http://scidok.sulb.uni-saarland.de/volltexte/2013/5011/pdf/RR_93_02_.pdf, last downloaded Mar. 5, 2014.
Top Down and Bottom Up Planning Project Management Tool Set, "PM Tool with Top Down Planning Design and Bottom Up Processing Strategic Approach", http://2-plan.com/free-project-management-software-2-plan-desktop/top-down-and-bottom-up-planning-project-management-tool-set.html, last downloaded Mar. 5, 2014.
Project Management Shortcuts: Resource Leveling Made Easy—LiquidPlanner, http://www.liquidplanner.com/blog/project-management-shortcuts-resource-leveling-made-easy/, last downloaded Mar. 5, 2014.
RationalPlan Project Management Software—MultiProject Version, http://www.rationalplan.com/multi-project-management-software.php, last downloaded Mar. 5, 2014.
Scheduling Projects Reference 1, http://www.openxprocess.com/help/reference/scheduler/overview.html, last downloaded Mar. 5, 2014.
Scheduling Projects Reference 2, http://www.openxprocess.com/help/reference/scheduler/specify_tasks.html, last downloaded Mar. 5, 2014.
Andy Carmichael, Ph.D.,CEng, FBCS, "Planning by Priority, How to prioritize project tasks to maximize delivered business benefits", Ivis Technologies, Issue 2.0, Scheduling Projects Reference 3, http://www.openxprocess.com/whitepapers/Planning%20By%20Priority%20_04_.pdf, last downloaded Mar. 5, 2014.
Asana Guide, The path to doing great things, "Sorting & Filtering", https://asana.com/guide/projects/sorting, last downloaded Mar. 5, 2014.
TaskInsight 3.0 Task Manager Updates Timeline Graphics and Functionality, http://prmac.com/release-id-29274.htm, last downloaded Mar. 5, 2014.
Anant Shree Agrawal, "Task Prioritization Rules for Project Execution", (IJERA) ISSN: 2248-9622, vol. 2, Issue 4, Jul.-Aug. 2012, pp. 1208-1212, http://www.ijera.com/papers/Vol2_issue4/GT2412081212.pdf, last downloaded Mar. 5, 2014.
Time Management Software—Get Things Done with Achieve Planner Task Management, http://www.effexis.com/achieve/planner.htm, last downloaded Mar. 5, 2014.
Use top-down planning to create summary tasks (or phases)—Project—Office.com, http://office.microsoft.com/en-in/project-help/use-top-down-planning-to-create-summary-tasks-or-phases-HA010376809.aspx, last downloaded Mar. 5, 2014.
VMware Horizon Mirage Web Manager Guide, v4.2, Jun. 2013, http://www.vmware.com/pdf/mirage-web-manager-guide-42.pdf, last downloaded Mar. 5, 2014.
What is Project Management—LeanKit, http://leankit.com/project-management/what-is-project-management/, last downloaded Mar. 5, 2014.
Workforce Scheduler, Employee Scheduling Software Saves Time and Money and Gets People Working, by Kronos www.kronos.com/Scheduling-Software/Employee-Scheduling-Software.aspx, last downloaded Mar. 5, 2014.
Niladri DE et al., U.S. Appl. No. 14/200,057, filed Mar. 7, 2014.
Niladri DE et al., U.S. Appl. No. 14/200,054, filed Mar. 7, 2014.
Niladri DE et al., U.S. Appl. No. 14/269,300, filed May 5, 2014.
Niladri DE et al., U.S. Appl. No. 14/273,646, filed May 9, 2014.
Niladri DE et al., U.S. Appl. No. 14/300,725, filed Jun. 10, 2014.
Oracle, "Oracle RCUI Guidelines", Oracle ADF Rich Client User Interface Guidelines, Gantt Chart Usage Guideline, http://www.oracle.com/webfolder/ux/middleware/richclient/index.html?/webfolder/ux/middleware/richclient/guidelines5/gantt.html, last downloaded Jan. 15, 2015.
Opinion Center Li, "Microsoft Project", http://opinioncenter.li/microsoft-project/, last downloaded Jan. 15, 2015.
Seavus Project Viewer, "User Manual for Seavus Project Viewer 11", http://www.seavusprojectviewer.com/support/documents/, last visited on Jan. 22, 2015, 118 pages.

\* cited by examiner

TASK PROGRESS UPDATE HISTORY VISUALIZATION SYSTEM

FIELD

One embodiment is directed to a computer system, and more particularly, to a computer system that displays data.

BACKGROUND

Project managers or planners typically work with a project plan timeline, which is a set of tasks that are associated with an overall project or objective, and that are displayed over a timeline within a user interface. Project managers typically define the project plan timeline, and thus, typically define how tasks are distributed within the project plan timeline.

Traditionally, a system visually depicts task progress within the project plan timeline as a shaded region of a rectangle, or other visual representation of a task, that is displayed within the project plan timeline. This is based on a visual analogy of mercury filling a channel. But this visual presentation of task progress only shows the latest task progress that has been reported. Further, this visual presentation of task progress does not indicate when the latest task progress was reported. Even though the system might have access to details of other incremental task progress updates that have previously been reported for a task, the system typically does not have a way to visually depict such details within the project plan timeline.

SUMMARY

One embodiment is a system that visualizes task progress update history. The system displays a project plan timeline within a user interface, where the project plan timeline includes task indicators that visually represent tasks and a timeline including time unit indicators that visually represent time units. The system further displaying task progress update history within the project plan timeline, where the task progress update history includes task progress update indicators that visually represent task progress updates, and where a task progress update indicator visually indicates a date-time of a task progress update and a task progress reported by the task progress update.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, a task progress update history visualization system that includes a graphical user interface (or "user interface") is provided. The task progress update history visualization system can display, or otherwise visually depict, "task progress update history" within the user interface, where "task progress update history" includes a history of one or more updates that have been provided regarding task progress of one or more tasks. Such a history can include, among other things, a date-time (i.e., date and/or time) of each update and a task progress reported by each update. The task progress update history visualization system can display the task progress update history within a project plan timeline that is also displayed within the user interface, where a display of one or more tasks of the project plan timeline is overlaid with a display of the task progress update history. Further, the task progress update history can be displayed within the project plan timeline as one or more task progress update indicators, such as arrows, where a task progress update indicator indicates a task progress update. Even further, the one or more task progress update indicators can be displayed within a task indicator, such as a rectangle, that is also displayed within the project plan timeline, where a task indicator represents a task of the project plan timeline. Thus, the task progress update history visualization system can display a set of task progress update indicators for each task displayed within a project plan timeline, where the set of task progress update indicators indicate a set of task progress updates that have occurred for each task. Further, the task progress update history visualization system can allow for visual editing of task progress update indicators that are displayed within the project plan timeline.

Figure 1:
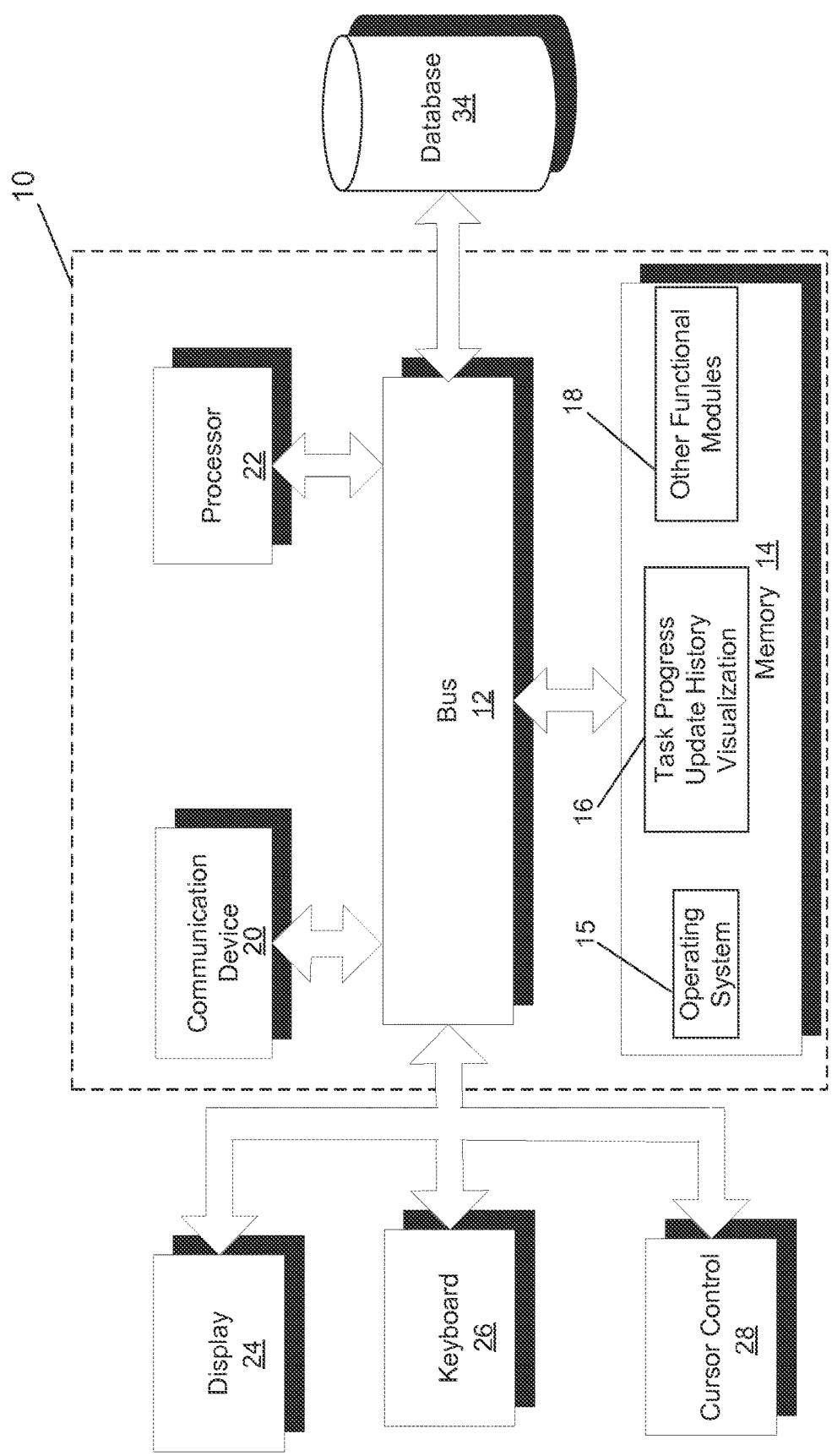
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a task progress update history visualization module 16, as well as other functional modules 18. Operating system 15 can provide an operating system functionality for system 10. Task progress update history visualization module 16 can provide functionality for visualizing task progress update history within a user interface, as further disclosed below. In certain embodiments, task progress update history visualization module 16 can comprise a plurality of modules, where each module provides specific individual functionality for visualizing task progress update history within a user interface. System 10 can also be part of a larger system. Thus, system 10 can include one or more additional functional modules 18 to include the additional functionality. For example, functional modules 18 may include modules that provide additional functionality, such as functionality of a "Primavera Enterprise Project Portfolio Management" by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Traditionally, as previously described, systems visually depicted task progress within a project plan timeline as a shaded region of a rectangle (either horizontal or vertical), or other visual representation of a task, that is displayed within the project plan timeline. For example, for a task starting on Monday and finishing on Friday, a task progress of the task may be reported as 0.5 days. This progress would typically be visually depicted by shading, or filling-in, a portion of a rectangle that represented the task and that was displayed within the project plan timeline. Such visual depictions of task progress only indicate a most recent task progress of the task that has been reported. Further, such visual depictions of task progress do not indicate when the most recent task progress of the task was reported. Even further, such visual depictions of task progress do not indicate whether the task progress of the task is faster or slower than the planned task progress of the task. In the aforementioned example, if a project manager reviews a task progress of the task on Wednesday by reviewing the display of the project plan timeline, and identifies the progress as 0.5 days, the project manager may conclude that the task is 2.5 days behind schedule. However, this may not be true, as it is possible that the task has progressed since the last task progress update, and that the subsequent task progress has not yet been reported.

Some systems may provide a history table that indicates a number of incremental progress updates that were reported as well as a date-time that each incremental progress update was reported. However, a history table is generally only provided for a single task, and generally does not include task progress update history for multiple tasks. Further, a history table is generally not shown within a same task management user interface that a project plan timeline is shown. Other systems may provide a progress trend graph rather than a history table. However, similar to a history table, a progress trend graph is generally only provided for a single task, and generally does not include task progress update history for multiple tasks. Further, also similar to a history table, a progress trend graph is generally not shown within a same task management user interface that a project plan timeline is shown.

As also previously described, in accordance with an embodiment, a task progress update history visualization system can display, or otherwise visually depict, task progress update history within a user interface. The task progress update history can include a history of one or more updates that have been provided regarding task progress of one or more tasks. Such a history can include, among other things, a date of each update and a task progress reported by each update. Further, the task progress update history can be displayed within a project plan timeline as one or more task progress update indicators, such as arrows. Further, a display of one or more tasks of the project plan timeline can be overlaid with a display of the task progress update history. A task progress update indicator can indicate a task progress update. Further, the one or more task progress update indicators can be displayed within a task indicator, such as a rectangle, that is also displayed within the project plan timeline, where the task indicator represents a task of the project plan timeline.

Such a visual depiction of task progress update history can be very useful, and very helpful, in various scenarios. Such scenarios can include the following example scenarios.

In one example scenario, a task progress of a task can be reported as being significantly behind a planned task progress of the task. However, this could be due to one of two distinct reasons. The first reason is that, even though progress updates have been provided regularly, the actual task progress has been slower than the planned task progress of the task. The second reason is that, although the actual task progress has been consistent with, or faster than, the planned task progress of the task, recent progress updates have not been provided, resulting in an inaccurate indication of task progress. Unless the task progress update history is examined, it can be difficult to determine whether the reported task progress of the task is significantly behind the planned task progress of the task because of the first reason or because of the second reason.

In another example scenario, a project manager may want to know whether progress updates are being provided frequently enough. In order to make this determination, the project manager is required to examine task progress update history for every task within a project plan timeline. However, in conventional task management systems, the project manager will typically be required to drill-down to each individual task to examine the task's task progress update history, which is typically displayed in a table of dates and numbers. Such efforts can be extremely daunting, if not humanly impossible, for a large-sized project with a large number of tasks.

Further, in another example scenario, a project manager may want to analyze a rate of progress for a task, such as when progress slowed down for the task, and when progress sped up for the task. Similar to the aforementioned example scenario, in order to make this determination, the project manager is required to examine task progress update history for the task. However, it can be difficult to identify the rate of progress by merely studying a history table of dates and numbers. Further, if the project manager wants to determine a rate of progress for all tasks in a project plan timeline, the project manager is typically required to drill-down to each individual task to examine the task's task progress update history. Thus, it can be very tedious to analyze a rate of progress for a large number of tasks. Therefore, it can very useful to display, or otherwise visually depict, the task progress update history for all tasks of a project plan timeline within a single user interface.

In another example scenario, a project manager may want to identify potential "spurious task progress updates", where a "spurious task progress update" is a false task progress update (i.e., the task progress reported by the update does not match the actual task progress). For example, within a span of a single day, a task progress of four days has been reported via four consecutive task progress updates. This may potentially indicate that only the first task progress update is legitimate, and the other three task progress updates are spurious task progress updates. Unless task progress update history for all tasks is displayed, or otherwise visually depicted, within a single user interface, it can be very difficult for the project manager to identify such anomalies.

Further, in another example scenario, a project manager may want to identify if there were a significant number of corrections or adjustments made to a reported task progress of a task, where a significant number of corrections or adjustments might indicate a problem. It would be difficult to identify such trends unless task progress update history for all tasks is displayed, or otherwise visually depicted, within a single user interface.

Thus, there is a need to display, or otherwise visually depict, task progress update history for all tasks within a single user interface at the same time. Further, there is a further need to overlay a visualization of tasks within a project plan timeline with a visualization of task progress update history. Therefore, according to an embodiment, a task progress update history visualization system can display, or otherwise visually depict, task progress update history within a user interface, where the task progress update history visualization system can display the task progress update history within a project plan timeline that is also displayed within the user interface, and where a display of one or more tasks of the project plan timeline is overlaid with a display of the task progress update history.

Figure 2:
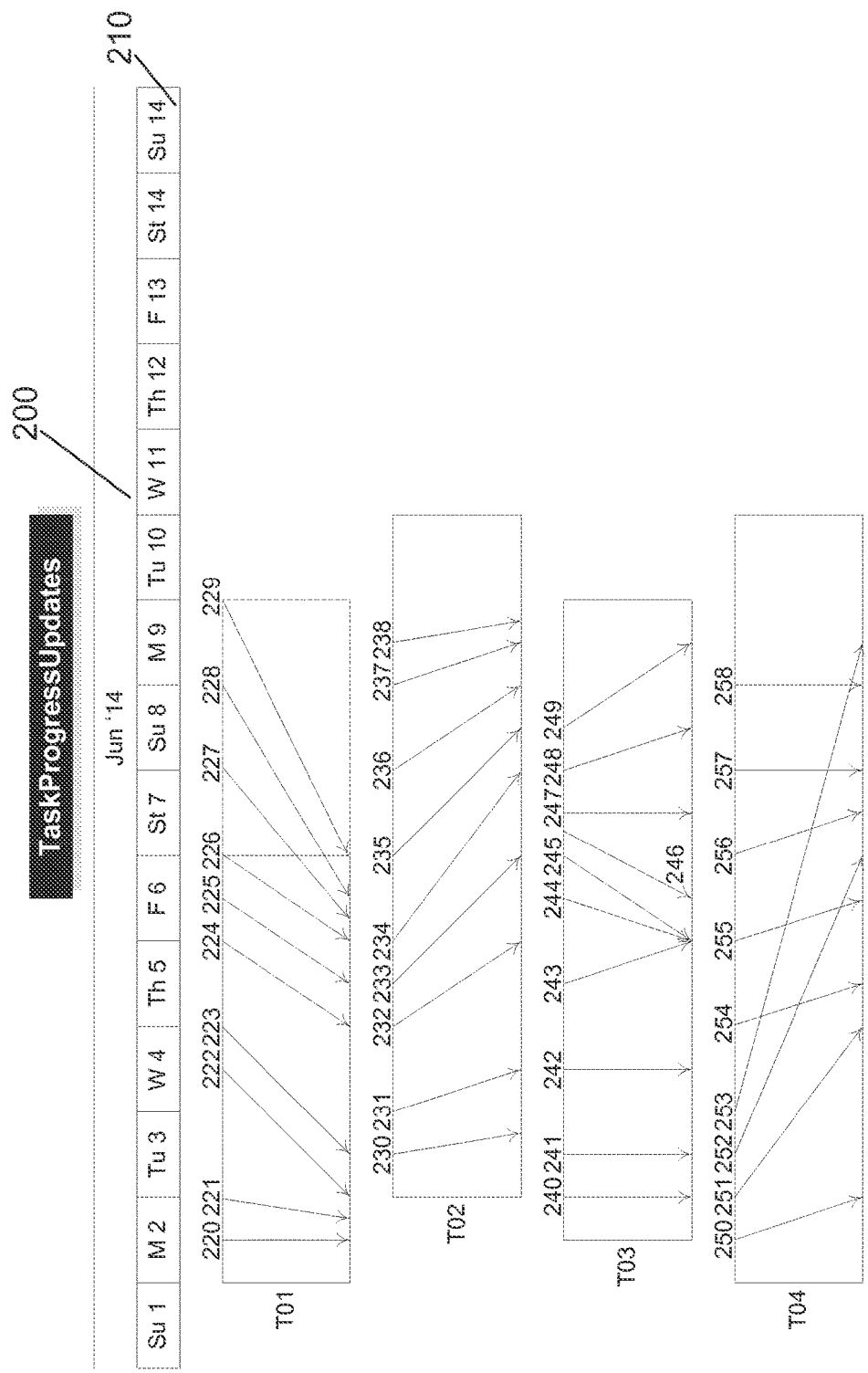
FIG. 2 illustrates a project plan timeline that is displayed by a task progress update history visualization system, where the project plan timeline includes task progress update history, according to an embodiment of the invention.

FIG. 2 illustrates a project plan timeline 200 that is displayed by a task progress update history visualization system, such as system 10 of FIG. 1, where project plan timeline 200 includes task progress update history, according to an embodiment of the invention. More specifically, project plan timeline 200 includes timeline 210 that includes one or more time units visually represented by one or more time unit indicators that are displayed within a user interface. Time units can be seconds, minutes, hours, days, weeks, months, years, etc. In the illustrated embodiment, timeline 210 is a horizontal time axis, where the time unit indicators are displayed along a horizontal axis, either from left to right, as illustrated in FIG. 2, or from right to left. In an alternate embodiment, timeline 210 can be a vertical time axis, where the time unit indicators are displayed along a vertical axis, either from bottom to top or top to bottom.

Project plan timeline 200 further includes tasks T01, T02, T03, and T04. Tasks T01, T02, T03, and T04 are displayed within project plan timeline 200, where project plan timeline 200 is displayed within a user interface. More specifically, task indicators (e.g., rectangles as illustrated in FIG. 2) are displayed within the user interface, where the task indicators represent tasks T01, T02, T03, and T04. Task T01 has a planned duration of 5 days, a planned start date-time of Monday, Jun. 2, 2014 (start-of-day), and a planned finish date-time of Friday, Jun. 6, 2014 (end-of-day). Task T02 has a planned duration of 8 days, a planned start date-time of Tuesday, Jun. 3, 2014 (start-of-day), and a planned finish date-time of Tuesday, Jun. 10, 2014 (end-of-day). Task T03 has a planned duration of 7.5 days, a planned start date-time of Monday, Jun. 2, 2014 (mid-day), and a planned finish date-time of Monday, Jun. 9, 2014 (end of-day). Task T04 has a planned duration of 9 days, a planned start date-time of Monday, Jun. 2, 2014 (start-of-day), and a planned finish date-time of Tuesday, Jun. 10, 2014 (end-of day).

According to the embodiment, the task progress update history visualization system can use the task indicators that represent tasks T01, T02, T03, and T04 to visually depict task progress update history for tasks T01, T02, T03, and T04. More specifically, the task progress update history visualization system can display task progress update indicators for each task of tasks T01, T02, T03, and T04, where each task progress update indicator visually represents a task progress update for the task. In the illustrated embodiment, the task progress update indicators are arrows.

In the illustrated embodiment where timeline 210 is a horizontal time axis, a left edge of a task indicator indicates a planned start date-time, and a right edge of a task indicator indicates a planned finish date-time. In this embodiment, a task progress update indicator originates from a top edge of a task indicator and terminates at a bottom edge of the task indicator. Thus, a date-time denoted by an origination point of a task progress update indicator within a top edge of a task indicator indicates the date-time when progress was reported for a task visually represented by the task indicator within the task progress update history visualization system. Similarly, a position denoted by a termination point of a task progress update indicator within a bottom edge of a task indicator indicates a cumulative amount of actual progress for a task visually represented by the task indicator. For example, a termination point at a left edge of the task indicator indicates 0% task completion, and a termination point at a right edge of the task indicator indicates 100% task completion.

In an alternate embodiment, where timeline 210 is a vertical time axis, a bottom edge of a task indicator indicates a planned start date-time, and a top edge of a task indicator indicates a planned finish date-time. In this embodiment, a task progress update indicator originates from a left edge of a task indicator and terminates at a right edge of the task indicator. Thus, a date-time denoted by an origination point of a task progress update indicator within a left edge of a task indicator indicates the date-time when progress was reported for a task visually represented by the task indicator within the task progress update history visualization system. Similarly, a position denoted by a termination point of a task progress update indicator within a right edge of a task indicator indicates a cumulative amount of actual progress for a task visually represented by the task indicator. For example, a termination point at a bottom edge of the task indicator indicates 0% task completion, and a termination point at a top edge of the task indicator indicates 100% task completion.

In some scenarios, a task may not finish within a planned time (i.e., by a planned finish date-time). In these scenarios, a display of a task indicator can be updated to reflect that the task has not finished within the planned time. For example, where a task indicator is a rectangle, an extension rectangle which extends from the original rectangle can be displayed within a user interface. Further, the original rectangle can be a solid rectangle, where the extension rectangle can be a dashed rectangle. A far edge of the extension rectangle (e.g., a right edge of the extension rectangle where the extension rectangle is a horizontal rectangle, or a top edge of the extension rectangle where the extension rectangle is a vertical rectangle) indicates an adjusted finish date-time, where the adjusted finish date-time can be an adjusted planned finish date-time or an adjusted actual finish date-time. According to an embodiment, a task progress update indicator can originate from within a portion of a task indicator that is an extension rectangle.

In an embodiment, a user can interact with a displayed task progress update indicator by "dragging" an origination point of the task progress update indicator from a first position to a second position. In response to this user interaction, the task progress update history visualization system can modify a date-time of a task progress update visually represented by the task progress update indicator, where the modification is based on the second position of the origination point. More specifically, the date-time of a task progress update can be modified from an original date-time denoted by the first position of the origination point to a new date-time denoted by the second position of the origination point. A user can further interact with the displayed task progress update indicator by "dragging" a termination point of the task progress update indicator from a first position to a second position. In response to this user interaction, the task progress update history visualization system can modify a task progress reported by the task progress update visually presented by the task progress update indicator, where the modification is based on the second position of the termination point. More specifically, the task progress reported by the task progress update can be modified from an original task progress denoted by the first position of the termination point to a new task progress denoted by the second position of the termination point.

According to an embodiment, by comparing "skews" of task progress update indicators, a user can determine a rate of task progress for a task. A "skew" is a measure of an amount of deviation of a task progress update indicator from a defined task progress update indicator. In certain embodiments where a task progress update indicator is an arrow, a "skew" is a measurement of an amount of deviation from a defined arrow, such as a vertical arrow or horizontal arrow. Thus, the greater amount of deviation an arrow has from a vertical arrow or horizontal arrow, the greater the "skew" of the arrow. In an embodiment, a "skew" of an arrow can be a "slope" of the arrow, where a "slope" is a measurement that describes both a direction and steepness of the arrow, and where the steepness of the arrow is measured by an absolute value of the "slope." By determining the rate of task progress, a user can determine whether the task is likely to be finished by the planned finish date-time. In one embodiment, if there are time unit indicators displayed within timeline 210 that visually represent "non-working time units" (i.e., time units where no work on a task is scheduled to be performed), a skew of a task progress update can become distorted. To avoid this, the task progress update history visualization system can hide one or more time unit indicators from the user interface. In other words, the task progress update history visualization system can cause the one or more time unit indicators not to be displayed within the user interface.

For task T01, the task progress update history visualization system displays task progress update indicators 220, 221, 222, 223, 224, 225, 226, 227, 228, and 229. Task progress update indicator 220 visually represents a first task progress update received by the task progress update history visualization system. An origination point of task progress update indicator 220 indicates that the first task progress update was reported Monday, Jun. 2, 2014 (mid-day). A termination point of task progress update indicator 220 indicates that the first task progress update reported 0.5 days of cumulative task progress. Thus, task progress update indicator 220 visually indicates that a task progress of task T01 is progressing according to schedule. Further, a skew of task progress update indicator 220 is zero (i.e., task progress update indicator 220 is a vertical arrow), which also visually indicates that the task progress of task T01 is progressing according to schedule. Task progress update indicator 221 visually represents a second task progress update received by the task progress update history visualization system. An origination point of task progress update indicator 221 indicates that the second task progress update was reported Monday, Jun. 2, 2014 (end-of-day). A termination point of task progress update indicator 221 indicates that the second task progress update reported 0.75 days of cumulative task progress. Thus, task progress update indicator 221 visually indicates that the task progress of task T01 is progressing 0.25 days behind schedule. Further, a skew of task progress update indicator 221 is non-zero and positive (i.e., task progress update indicator 221 is a diagonal arrow that leans towards the right), which also visually indicates that the task progress of task T01 is progressing behind schedule.

Task progress update indicator 222 visually represents a third task progress update received by the task progress update history visualization system. An origination point of task progress update indicator 222 indicates that the third task progress update was reported Wednesday, Jun. 4, 2014 (mid-day). Thus, task progress update indicator 222 visually indicates that there were no task progress updates for 1.5 days between the second task progress update and the third progress update. A termination point of task progress update indicator 222 indicates that the third task progress update reported 1 day of cumulative task progress. Thus, task progress update indicator 222 visually indicates that the task progress of task T01 is progressing 1.5 days behind schedule. Further, a skew of task progress update indicator 222 is numerically greater (i.e., more positive) than a skew of task progress update indicator 221, which indicates that a delay of the task progress of task T01 is increasing (i.e., a rate of the task progress of task T01 is decreasing). Task progress update indicator 223 visually represents a fourth task progress update received by the task progress update history visualization system. An origination point of task progress update indicator 223 indicates that the fourth task progress update was reported Wednesday, Jun. 4, 2014 (end-of-day). A termination point of task progress update indicator 223 indicates that the fourth task progress update reported 1.5 days of cumulative task progress. Thus, task progress update indicator 223 visually indicates that the task progress of task T01 is progressing 1.5 days behind schedule. Further, a skew of task progress update indicator 223 is identical to a skew of task progress update indicator 222, which indicates that a delay of the task progress of task T01 is remaining constant (i.e., a rate of the task progress of task T01 is remaining constant).

Task progress update indicator 224 visually represents a fifth task progress update received by the task progress update history visualization system. An origination point of task progress update indicator 224 indicates that the fifth task progress update was reported Thursday, Jun. 5, 2014 (end-of-day). A termination point of task progress update indicator 224 indicates that the fifth task progress update reported 3 days of cumulative task progress. Thus, task progress update indicator 224 visually indicates that the task progress of task T01 is progressing 1 day behind schedule. Further, a skew of task progress update indicator 224 is numerically less (i.e., less positive) than a skew of task progress update indicator 223, which indicates that a delay of the task progress of task T01 is decreasing (i.e., a rate of the task progress of task T01 is increasing). Task progress update indicator 225 visually represents a sixth task progress update received by the task progress update history visualization system. An origination point of task progress update indicator 225 indicates that the sixth task progress update was reported Friday, Jun. 6, 2014 (mid-day). A termination point of task progress update indicator 225 indicates that the sixth task progress update reported 3.5 days of cumulative task progress. Thus, task progress update indicator 225 visually indicates that the task progress of task T01 is progressing 1 day behind schedule. Further, a skew of task progress update indicator 225 is identical to a skew of task progress update indicator 224, which indicates that a delay of the task progress of task T01 is remaining constant (i.e., a rate of the task progress of task T01 is remaining constant).

Task progress update indicator 226 visually represents a seventh task progress update received by the task progress update history visualization system. An origination point of task progress update indicator 226 indicates that the seventh task progress update was reported Friday, Jun. 6, 2014 (end-of-day). A termination point of task progress update indicator 226 indicates that the seventh task progress update reported 4 days of cumulative task progress. Thus, task progress update indicator 226 visually indicates that the task progress of task T01 is progressing 1 day behind schedule. Further, a skew of task progress update indicator 226 is identical to a skew of task progress update indicator 225, which indicates that a delay of the task progress of task T01 is remaining constant (i.e., a rate of the task progress of task T01 is remaining constant). Task progress update indicator 227 visually represents an eighth task progress update received by the task progress update history visualization system. An origination point of task progress update indicator 227 indicates that the eighth task progress update was reported Saturday, Jun. 7, 2014 (end-of-day). The origination point denotes a date-time (i.e., Saturday, Jun. 7, 2014 (end-of-day)) that is after a planned finish date-time of task T01. Thus, the task progress update history visualization system updates a display of a task indicator that visually represents task T01 to include an extension indicator which extends from the original task indicator. Thus, a top edge of the task indicator that visually represents task T01 is extended, and a bottom edge of the task indicator that visually presents task T01 is also extended. A termination point of task progress update indicator 227 indicates that the eighth task progress update reported 4.25 days of cumulative task progress. Thus, task progress update indicator 227 visually indicates that task progress of task T01 is progressing 1.75 days behind schedule. Further, a skew of task progress update indicator 227 is numerically greater than a skew of task progress update indicator 226, which indicates that a delay of the task progress of task T01 is increasing (i.e., a rate of the task progress of task T01 is decreasing).

Task progress update indicator 228 visually represents a ninth task progress update received by the task progress update history visualization system. An origination point of task progress update indicator 228 indicates that the ninth task progress update was reported Sunday, Jun. 8, 2014 (end-of-day). A termination point of task progress update indicator 228 indicates that the ninth task progress update reported 4.5 days of cumulative task progress. Thus, task progress update indicator 228 visually indicates that the task progress of task T01 is progressing 2.5 days behind schedule. Further, a skew of task progress update indicator 228 is numerically greater than a skew of task progress update indicator 227, which indicates that a delay of the task progress of task T01 is increasing (i.e., a rate of the task progress of task T01 is decreasing). Task progress update indicator 229 visually represents a tenth task progress update received by the task progress update history visualization system. An origination point of task progress update indicator 229 indicates that the tenth task progress update was reported Monday, Jun. 9, 2014 (end-of-day). A termination point of task progress update indicator 229 indicates that the tenth task progress update reported 5 days of cumulative task progress. Thus, task progress update indicator 229 visually indicates that task progress of task T01 has completed 3 days behind schedule. Further, a skew of task progress update indicator 229 is numerically greater than a skew of task progress update indicator 228, which indicates that a delay of the task progress of task T01 has increased (i.e., a rate of the task progress of task T01 has decreased).

For task T02, the task progress update history visualization system displays task progress update indicators 230, 231, 232, 233, 234, 235, 236, 237, and 238. Task progress update indicator 230 visually represents a first task progress update received by the task progress update history visualization system. An origination point of task progress update indicator 230 indicates that the first task progress update was reported Tuesday, Jun. 3, 2014 (mid-day). A termination point of task progress update indicator 230 indicates that the first task progress update reported 0.75 days of cumulative task progress. Thus, task progress update indicator 230 visually indicates that a task progress of task T02 is progressing 0.25 days ahead of schedule. Further, a skew of task progress update indicator 230 is non-zero and negative (i.e., task progress update indicator 230 is a diagonal arrow that leans toward the left), which also visually indicates that the task progress of task T02 is progressing ahead of schedule. Task progress update indicator 231 visually represents a second task progress update received by the task progress update history visualization system. An origination point of task progress update indicator 231 indicates that the second task progress update was reported Tuesday, Jun. 3, 2014 (end-of-day). A termination point of task progress update indicator 231 indicates that the second task progress update reported 1.5 days of cumulative task progress. Thus, task progress update indicator 231 visually indicates that the task progress of task T02 is progressing 0.5 days ahead of schedule. Further, a skew of task progress update indicator 231 is numerically greater (i.e., more negative) than a skew of task progress update indicator 230, which indicates that an advance of the task progress of task T02 is increasing (i.e., a rate of the task progress of task T02 is increasing).

Task progress update indicator 232 visually represents a third task progress update received by the task progress update history visualization system. An origination point of task progress update indicator 232 indicates that the third task progress update was reported Wednesday, Jun. 4, 2014 (end-of-day). A termination point of task progress update indicator 232 indicates that the third task progress update reported 3 days of cumulative task progress. Thus, task progress update indicator 232 visually indicates that the task progress of task T02 is progressing 1 day ahead of schedule. Further, a skew of task progress update indicator 232 is numerically greater than a skew of task progress update indicator 231, which indicates that an advance of the task progress of task T02 is increasing (i.e., a rate of the task progress of task T02 is increasing). Task progress update indicator 233 visually represents a fourth task progress update received by the task progress update history visualization system. An origination point of task progress update indicator 233 indicates that the fourth task progress update was reported Thursday, Jun. 5, 2014 (mid-day). A termination point of task progress update indicator 233 indicates that the fourth task progress update reported 4 days of cumulative task progress. Thus, task progress update indicator 233 visually indicates that the task progress of task T02 is progressing 1.5 days ahead of schedule. Further, a skew of task progress update indicator 233 is numerically greater than a skew of task progress update indicator 232, which indicates that an advance of the task progress of task T02 is increasing (i.e., a rate of the task progress of task T02 is increasing).

Task progress update indicator 234 visually represents a fifth task progress update received by the task progress update history visualization system. An origination point of task progress update indicator 234 indicates that the fifth task progress update was reported Thursday, Jun. 5, 2014 (end-of-day). A termination point of task progress update indicator 234 indicates that the fifth task progress update reported 5 days of cumulative task progress. Thus, task progress update indicator 234 visually indicates that the task progress of task T02 is progressing 2 days ahead of schedule. Further, a skew of task progress update indicator 234 is numerically greater than a skew of task progress update indicator 233, which indicates that an advance of the task progress of task T02 is increasing (i.e., a rate of the task progress of task T02 is increasing). Task progress update indicator 235 visually represents a sixth task progress update received by the task progress update history visualization system. An origination point of task progress update indicator 235 indicates that the sixth task progress update was reported Friday, Jun. 6, 2014 (end-of-day). A termination point of task progress update indicator 235 indicates that the sixth task progress update reported 5.5 days of cumulative task progress. Thus, task progress update indicator 235 visually indicates that the task progress of task T02 is progressing 1.5 days ahead of schedule. Further, a skew of task progress update indicator 235 is numerically less (i.e., less negative) than a skew of task progress update indicator 224, which indicates that an advance of the task progress of task T02 is decreasing (i.e., a rate of the task progress of task T02 is decreasing).

Task progress update indicator 236 visually represents a seventh task progress update received by the task progress update history visualization system. An origination point of task progress update indicator 236 indicates that the seventh task progress update was reported Saturday, Jun. 7, 2014 (end-of-day). A termination point of task progress update indicator 236 indicates that the seventh task progress update reported 6 days of cumulative task progress. Thus, task progress update indicator 236 visually indicates that the task progress of task T02 is progressing 1 day ahead of schedule. Further, a skew of task progress update indicator 236 is less than a skew of task progress update indicator 235, which indicates that an advance of the task progress of task T02 is decreasing (i.e., a rate of the task progress of task T02 is decreasing). Task progress update indicator 237 visually represents an eighth task progress update received by the task progress update history visualization system. An origination point of task progress update indicator 237 indicates that the eighth task progress update was reported Sunday, Jun. 8, 2014 (end-of-day). A termination point of task progress update indicator 237 indicates that the eighth task progress update reported 6.5 days of cumulative task progress. Thus, task progress update indicator 237 visually indicates that the task progress of task T02 is progressing 0.5 days ahead of. Further, a skew of task progress update indicator 237 is numerically less than a skew of task progress update indicator 236, which indicates that an advance of the task progress of task T02 is decreasing (i.e., a rate of the task progress of task T02 is decreasing).

Task progress update indicator 238 visually represents a ninth task progress update received by the task progress update history visualization system. An origination point of task progress update indicator 238 indicates that the ninth task progress update was reported Monday, Jun. 9, 2014 (mid-day). A termination point of task progress update indicator 238 indicates that the ninth task progress update reported 6.75 days of cumulative task progress. Thus, task progress update indicator 238 visually indicates that the task progress of task T02 is progressing 0.25 days ahead of schedule. Further, a skew of task progress update indicator 238 is numerically less than a skew of task progress update indicator 237, which indicates that an advance of the task progress of task T02 is decreasing (i.e., a rate of the task progress of task T02 is decreasing). Further, the lack of additional task progress update indicators visually indicates that there were no further task progress updates after Monday, Jun. 9, 2014 (mid-day).

For task T03, the task progress update history visualization system displays task progress update indicators 240, 241, 242, 243, 244, 245, 246, 247, 248, and 249. Task progress update indicator 240 visually represents a first task progress update received by the task progress update history visualization system. An origination point of task progress update indicator 240 indicates that the first task progress update was reported Monday, Jun. 2, 2014 (end-of-day). A termination point of task progress update indicator 240 indicates that the first task progress update reported 0.5 days of cumulative task progress. Thus, task progress update indicator 240 visually indicates that a task progress of task T03 is progressing according to schedule. Further, a skew of task progress update indicator 240 is zero (i.e., task progress update indicator 240 is a vertical arrow), which also visually indicates that the task progress of task T03 is progressing according to schedule. Task progress update indicator 241 visually represents a second task progress update received by the task progress update history visualization system. An origination point of task progress update indicator 241 indicates that the second task progress update was reported Tuesday, Jun. 3, 2014 (mid-day). A termination point of task progress update indicator 241 indicates that the second task progress update reported 1 day of cumulative task progress. Thus, task progress update indicator 241 visually indicates that a task progress of task T03 is progressing according to schedule. Further, a skew of task progress update indicator 241 is zero (i.e., task progress update indicator 241 is a vertical arrow), which also visually indicates that the task progress of task T03 is progressing according to schedule.

Task progress update indicator 242 visually represents a third task progress update received by the task progress update history visualization system. An origination point of task progress update indicator 242 indicates that the third task progress update was reported Wednesday, Jun. 4, 2014 (mid-day). A termination point of task progress update indicator 242 indicates that the third task progress update reported 2 days of cumulative task progress. Thus, task progress update indicator 242 visually indicates that a task progress of task T03 is progressing according to schedule. Further, a skew of task progress update indicator 242 is zero (i.e., task progress update indicator 242 is a vertical arrow), which also visually indicates that the task progress of task T03 is progressing according to schedule. Task progress update indicator 243 visually represents a fourth task progress update received by the task progress update history visualization system. An origination point of task progress update indicator 243 indicates that the fourth task progress update was reported Thursday, Jun. 5, 2014 (mid-day). A termination point of task progress update indicator 243 indicates that the fourth task progress update reported 3.5 days of cumulative task progress. Thus, task progress update indicator 243 visually indicates that the task progress of task T03 is progressing 0.5 days ahead of schedule. Further, a skew of task progress update indicator 243 is non-zero and negative (i.e., task progress update indicator 243 is a diagonal arrow that leans to the left), which also visually indicates that the task progress of task T03 is progressing ahead of schedule (i.e., a rate of the task progress of task T03 is increasing).

Task progress update indicator 244 visually represents a fifth task progress update received by the task progress update history visualization system. An origination point of task progress update indicator 244 indicates that the fifth task progress update was reported Friday, Jun. 6, 2014 (mid-day). A termination point of task progress update indicator 244 indicates that the fifth task progress update reported 3.5 days of cumulative task progress. Thus, task progress update indicator 244 visually indicates that the task progress of task T03 has not progressed at all since the last task progress update, and further visually indicates that the task progress of task T03 is now progressing 0.5 days behind schedule. Further, a skew of task progress update indicator 244 is now in an opposite direction than a skew of task progress update indicator 243 (i.e., task progress update indicator 244 is a diagonal arrow leaning towards the right, where task progress update indicator 243 is a diagonal arrow leaning towards the left), which indicates that an advance of the task progress of task T03 is now a delay of the task progress of task T03 (i.e., a rate of the task progress of task T03 is decreasing). Task progress update indicator 245 visually represents a sixth task progress update received by the task progress update history visualization system. An origination point of task progress update indicator 245 indicates that the sixth task progress update was reported Friday, Jun. 6, 2014 (end-of-day). A termination point of the sixth task progress update indicator 245 indicates that the sixth task progress update reported 3.5 days of cumulative task progress. Thus, task progress update indicator 245 visually indicates that the task progress of task T03 has not progressed at all since the last task progress update, and further visually indicates that the task progress of task T03 is progressing 1 day behind schedule. Further, a skew of task progress update indicator 245 is greater than a skew of task progress update indicator 244, which indicates that a delay of the task progress of task T03 is increasing (i.e., a rate of the task progress of task T03 is decreasing).

Task progress update indicator 246 visually represents a seventh task progress update received by the task progress update history visualization system. An origination point of task progress update indicator 246 indicates that the seventh task progress update was reported Saturday, Jun. 7, 2014 (mid-morning). A termination point of task progress update indicator 246 indicates that the seventh task progress update reported 4 days of cumulative task progress. Thus, task progress update indicator 246 visually indicates that the task progress of task T03 has progressed since the last task progress update, and further visually indicates that the task progress of task T03 is progressing 0.75 days behind schedule. Further, a skew of task progress update indicator 246 is less than (more specifically, slightly less than) a skew of task progress update indicator 245, which indicates that a delay of the task progress of task T03 is decreasing (i.e., a rate of the task progress of task T03 is increasing). Task progress update indicator 247 visually represents an eighth task progress update received by the task progress update history visualization system. An origination point of task progress update indicator 247 indicates that the eighth task progress update was reported Saturday, Jun. 7, 2014 (mid-day). A termination point of task progress update indicator 247 indicates that the eighth task progress update reported 5 days of cumulative task progress. Thus, task progress update indicator 247 visually indicates that the task progress of task T03 has not caught up, and is progressing according to schedule as of Jun. 7, 2014 (mid-day). Further, a skew of task progress update indicator 247 is zero (i.e., task progress update indicator 247 is a vertical arrow), which also visually indicates that the task progress of task T03 is progressing according to schedule, and that a rate of the task progress of task T03 is increasing.

Task progress update indicator 248 visually represents a ninth task progress update received by the task progress update history visualization system. An origination point of task progress update indicator 248 indicates that the ninth task progress update was reported Saturday, Jun. 7, 2014 (end-of-day). A termination point of task progress update indicator 248 indicates that the ninth task progress update reported 6 days of cumulative task progress. Thus, task progress update indicator 248 visually indicates that the task progress of task T03 is progressing 0.5 days ahead of schedule. Further, a skew of task progress update indicator 248 is non-zero and negative (i.e., task progress update indicator 248 is a diagonal arrow that leans towards the left), which also visually indicates that the task progress of task T03 is progressing ahead of schedule (i.e., a rate of the task progress of task T03 is increasing). Task progress update indicator 249 visually represents a tenth task progress update received by the task progress update history visualization system. An origination point of task progress update indicator 249 indicates that the tenth task progress update was reported Sunday, Jun. 8, 2014 (mid-day). A termination point of task progress update indicator 249 indicates that the tenth task progress update reported 7 days of cumulative task progress. Thus, task progress update indicator 249 visually indicates that task progress of task T03 is progressing 1 day ahead of schedule. Further, a skew of task progress update indicator 249 is numerically greater than a skew of task progress update indicator 248, which indicates that an advance of the task progress of task T03 is increasing (i.e., a rate of the task progress of task T03 is increasing).

Thus, a convergence of task progress update indicators 243, 244, and 245 visually indicates a decrease in a rate of a task progress of task T03. Similarly, a divergence of task progress update indicators 247, 248, and 249 visually indicates an increase in a rate of a task progress of task T03.

For task T04, the task progress update history visualization system displays task progress update indicators 250, 251, 252, 253, 254, 255, 256, 257, and 258. Task progress update indicator 250 visually represents a first task progress update received by the task progress update history visualization system. An origination point of task progress update indicator 250 indicates that the first task progress update was reported Monday, Jun. 2, 2014 (mid-day). A termination point of task progress update indicator 250 indicates that the first task progress update reported 1 day of cumulative task progress. Thus, task progress update indicator 250 visually indicates that a task progress of task T04 is progressing 0.5 days ahead of schedule. Further, a skew of task progress update indicator 250 is non-zero and negative (i.e., task progress update indicator 250 is a diagonal arrow that lean towards the left), which also visually indicates that the task progress of task T04 is progressing ahead of schedule. Task progress update indicator 251 visually represents a second task progress update received by the task progress update history visualization system. An origination point of task progress update indicator 251 indicates that the second task progress update was reported Monday, Jun. 2, 2014 (end-of-day). A termination point of task progress update indicator 251 indicates that the second task progress update reported 3 days of cumulative task progress. Thus, task progress update indicator 251 visually indicates that the task progress of task T04 is progressing 2 days ahead of schedule. Further, a skew of task progress update indicator 251 is numerically greater than a skew of task progress update indicator 250, which indicates that an advance of the task progress of task T04 is increasing (i.e., a rate of the task progress of task T04 is increasing).

Task progress update indicator 252 visually represents a third task progress update received by the task progress update history visualization system. An origination point of task progress update indicator 252 indicates that the third task progress update was reported Tuesday, Jun. 3, 2014 (mid-day). A termination point of task progress update indicator 252 indicates that the third task progress update reported 5 days of cumulative task progress. Thus, task progress update indicator 252 visually indicates that the task progress of task T04 is progressing 3.5 days ahead of schedule. Further, a skew of task progress update indicator 252 is also numerically greater than a skew of task progress update indicator 251, which indicates that an advance of the task progress of task T04 is increasing (i.e., a rate of the task progress of task T04 is increasing). Task progress update indicator 253 visually represents a fourth task progress update received by the task progress update history visualization system. An origination point of task progress update indicator 253 indicates that the fourth task progress update was reported Tuesday, Jun. 3, 2014 (end-of-day). A termination point of task progress update indicator 253 indicates that the fourth task progress update reported 7.5 days of cumulative task progress. Thus, task progress update indicator 253 visually indicates that the task progress of task T04 is progressing 5.5 days ahead of schedule. Further, a skew of task progress update indicator 253 is again numerically greater than a skew of task progress update indicator 252, which indicates that an advance of the task progress of task T04 is increasing (i.e., a rate of the task progress of task T04 is increasing). As illustrated in FIG. 2, task progress update indicators 251, 252, and 253 are rapidly diverging. The rapid divergence of task progress update indicators 251, 252, and 253 can visually indicate that the task progress updates visually represented by task progress update indicators 251, 252, and 253 are potentially spurious task progress updates that require correction. As previously described, a spurious task progress update is a false task progress update (i.e., the task progress reported by the update does not match the actual task progress).

Task progress update indicator 254 visually represents a fifth task progress update received by the task progress update history visualization system. An origination point of task progress update indicator 254 indicates that the fifth task progress update was reported Wednesday, Jun. 4, 2014 (end-of-day). A termination point of task progress update indicator 254 indicates that the fifth task progress update reported 3.5 days of cumulative task progress. The cumulative task progress of 3.5 days is less than the cumulative task progress of 7.5 days reported by task progress update indicator 253, and less than the cumulative task progress of 5 days reported by task progress update indicator 252. Thus, task progress update indicator 254 intersects task progress update indicators 252 and 253. Thus, task progress update indicator 254 visually indicates a correction of task progress update indicators 252 and 253. Further, task progress update indicator 254 visually indicates that the task progress of task T04 is actually only progressing 0.5 days ahead of schedule. Task progress update indicator 255 visually represents a sixth task progress update received by the task progress update history visualization system. An origination point of task progress update indicator 255 indicates that the sixth task progress update was reported Thursday, Jun. 5, 2014 (end-of-day). A termination point of task progress update indicator 255 indicates that the sixth task progress update reported 4.5 days of cumulative task progress. Thus, task progress update indicator 255 visually indicates that the task progress of task T04 is progressing 0.5 days ahead of schedule. Further, a skew of task progress update indicator 255 is identical to a skew of task progress update indicator 254, which indicates that an advance of the task progress of task T04 is remaining constant (i.e., a rate of the task progress of task T04 is remaining constant).

Task progress update indicator 256 visually represents a seventh task progress update received by the task progress update history visualization system. An origination point of task progress update indicator 256 indicates that the seventh task progress update was reported Friday, Jun. 6, 2014 (end-of-day). A termination point of task progress update indicator 256 indicates that the seventh task progress update reported 5.5 days of cumulative task progress. Thus, task progress update indicator 256 visually indicates that the task progress of task T04 is progressing 0.5 days ahead of schedule. Further, a skew of task progress update indicator 256 is identical to a skew of task progress update indicator 255, which indicates that an advance of the task progress of task T04 is remaining constant (i.e., a rate of the task progress of task T04 is increasing). Task progress update indicator 257 visually represents an eighth task progress update received by the task progress update history visualization system. An origination point of task progress update indicator 257 indicates that the eighth task progress update was reported Saturday, Jun. 7, 2014 (end-of-day). A termination point of task progress update indicator 257 indicates that the eighth task progress update reported 6 days of cumulative task progress. Thus, task progress update indicator 257 visually indicates that the task progress of task T04 is progressing according to schedule. Further, a skew of task progress update indicator 257 is zero (i.e., task progress update indicator 257 is a vertical arrow), which also visually indicates that the task progress of task T04 is progressing according to schedule, and which further visually indicates that a rate of the task progress of task T04 is decreasing.

Task progress update indicator 258 visually represents a ninth task progress update received by the task progress update history visualization system. An origination point of task progress update indicator 258 indicates that the ninth task progress update was reported Sunday, Jun. 8, 2014 (end-of-day). A termination point of task progress update indicator 258 indicates that the ninth task progress update reported 7 days of cumulative task progress. Thus, task progress update indicator 258 visually indicates that the task progress of task T04 is progressing according to schedule. Further, a skew of task progress update indicator 258 is zero (i.e., task progress update indicator 258 is a vertical arrow), which also visually indicates that the task progress of task T04 is progressing according to schedule, and which further visually indicates that a rate of the task progress of task T04 is increasing as compared to a previous rate of the task progress of task T04 visually indicated by task progress update indicator 257. Further, the lack of additional task progress update indicators visually indicates that there were no further task progress updates after Sunday, Jun. 8, 2014 (end-of-day).

Thus, an intersection of task progress update indicators 254 and 255 with task progress update indicator 252 visually indicates a correction of the task progress update visually represented by task progress update indicator 252. Similarly, the intersection of task progress update indicators 254, 255, 256, 257, and 258 with task progress update indicator 253, visually indicates a correction of the task progress update visually represented by task progress update indicator 253. The correction of a task progress update can occur when it is determined that the task progress update is a spurious task progress update. Further, a rapid divergence of task progress update indicators 251, 252, and 253, visually indicates that the task progress updates visually represented by task progress update indicators 251, 252, and 253 are potentially spurious task progress updates.

Figure 3:
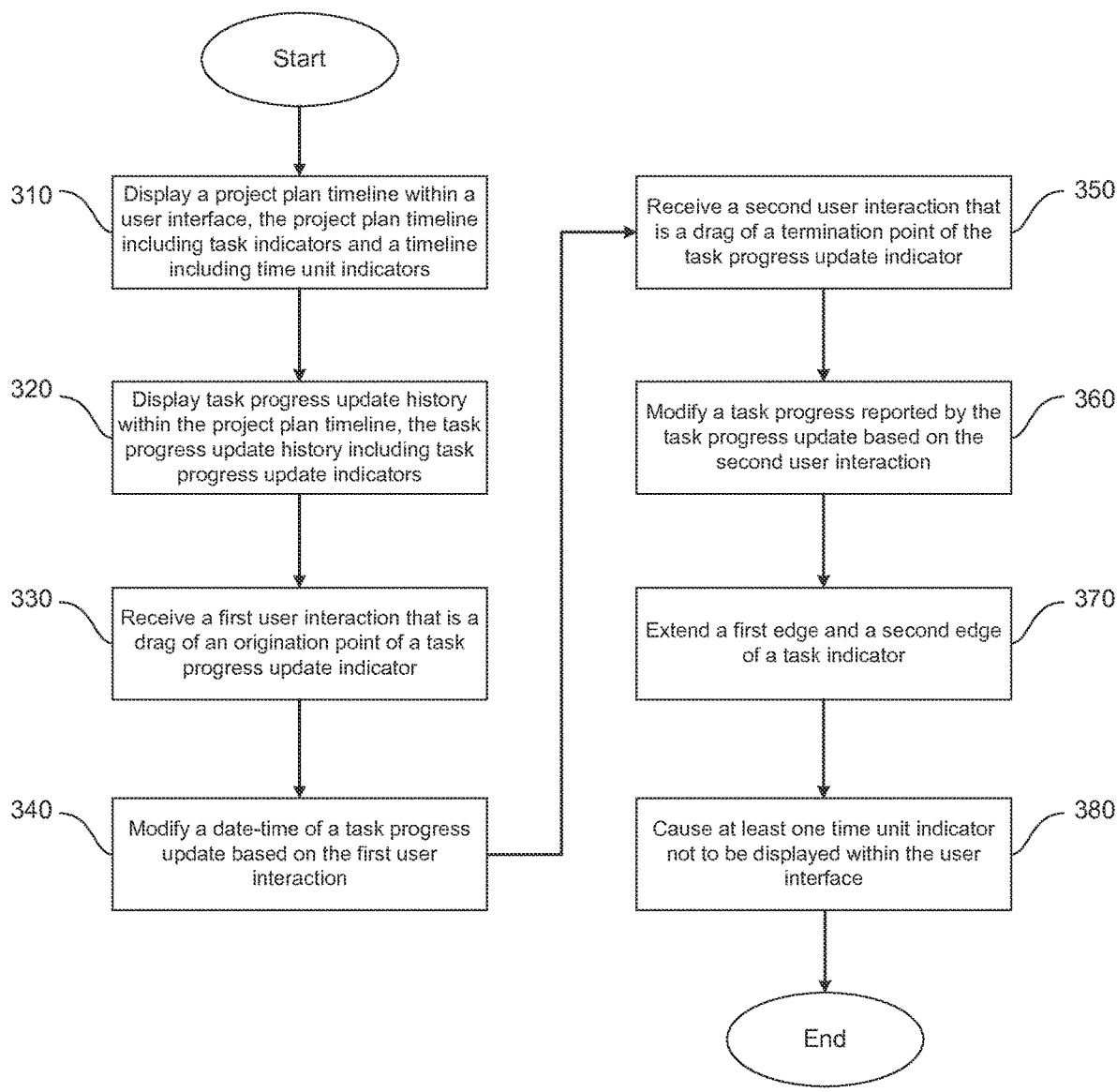
FIG. 3 illustrates a flow diagram of the functionality of a task progress update history visualization module, according to an embodiment of the invention.

FIG. 3 illustrates a flow diagram of the functionality of a task progress update history visualization module (such as task progress update history visualization module 16 of FIG. 1), according to an embodiment of the invention. In one embodiment, the functionality of the flow diagram of FIG. 3 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 310. At 310, a project plan timeline is displayed within a user interface, where the project plan timeline includes one or more task indicators that visually represent one or more tasks and a timeline including one or more time unit indicators that visually represent one or more time units. In certain embodiments, a task indicator can be a rectangle, where a first edge of the rectangle visually represents a start date-time of a task visually represented by the task indicator, and a second edge of the rectangle visually represents a finish date-time of the task visually presented by the task indicator. In some of these embodiments, where the timeline is a horizontal time axis, the rectangle can be a horizontal rectangle, the first edge can be a left edge, and the second edge can be a right edge. In other embodiments, where the timeline is a vertical time axis, the rectangle can be a vertical rectangle, the first can be a bottom edge, and the second edge can be a top edge. The flow then proceeds to 320.

At 320, task progress update history is displayed within the project plan timeline, where the task progress update history includes one or more task progress update indicators that visually represent one or more task progress updates, and where a task progress update indicator visually indicates a date-time of a task progress update and a task progress reported by the task progress update. In certain embodiments where a task indicator is a rectangle, a task progress update indicator can be an arrow, and the arrow can be displayed within the rectangle. Further, in certain embodiments, the arrow can originate within the first edge of the rectangle at an origination point that visually represents a date-time of the task progress update. In those embodiments, the arrow can terminate within the second edge of the rectangle at a termination point that visually represents a task progress reported by the task progress update.

In an embodiment, a skew of an arrow can visually indicate a rate of the task progress of the task progress update. Further, in the embodiment, a convergence of arrows can visually indicate a decrease in a rate of the task progress. Even further, in the embodiment, a divergence of arrows can visually indicate an increase in a rate of the task progress. Even further, in the embodiment, an intersection of arrows can visually indicate a correction of at least one task progress update of the one or more task progress updates. In one embodiment, the displayed task progress update history visually represents all task progress updates for all tasks of the one or more tasks. The flow then proceeds to 330.

At 330, a first user interaction is received that includes a drag of an origination point of a task progress update indicator to a new point within a first edge of a task indicator. In embodiments where the task indicator is a rectangle and the task progress update indicator is an arrow, the drag can be a drag of the origination point of the arrow to a new point within the first edge of the rectangle. The flow then proceeds to 340.

At 340, a date-time of a task progress update is modified based on the first user interaction. In certain embodiments, the date-time of the task progress update visually represented by the task progress update indicator is modified from the date-time visually represented by the origination point of the task progress update indicator to a date-time visually represented by the new point within the first edge of the task indicator. The flow then proceeds to 350.

At 350, a second user interaction is received that includes a drag of a termination point of a task progress update indicator to a new point within a second edge of a task indicator. In embodiments where the task indicator is a rectangle and the task progress update indicator is an arrow, the drag can be a drag of the termination point of the arrow to a new point within the second edge of the rectangle. The flow then proceeds to 360.

At 360, a task progress reported by the task progress update is modified based on the second user interaction. In certain embodiments, the task progress reported by the task progress update visually represented by the task progress update indicator is modified from the task progress visually represented by the termination point of the task progress update indicator to a task progress visually represented by the new point within the second edge of the task indicator. The flow then proceeds to 370.

At 370, a first edge and a second edge of the task indicator are extended. In embodiments where the task indicator is a rectangle, a first edge and a second edge of the rectangle can be extended. Further, an original portion of the first edge and second edge can be displayed using a solid line, and an extended portion of the first edge and the second edge can be displayed using a dashed line. Further, the origination point of the task progress update indicator can be within the extended portion of the first edge. The flow then proceeds to 380.

At 380, at least one time unit indicator is not displayed within the user interface. In other words, at least one time unit indicator is hidden within the user interface. This can prevent a distortion of the skew of the task progress update indicator. The flow then ends.

In one embodiment, system 10 is a specialized project management system/device that provides project management functionality, including the prioritizing, planning, managing, and evaluating of projects, programs, and portfolios. Embodiments include interactive activity Gantt charts and task flow charts such as shown in FIG. 2 to allow planners, schedulers, and project managers to communicate a more accurate and complete graphical representation of a project's schedule, and further may provide calendar and activity network views to provide team members with an intuitive view for displaying their assignments, along with the required information to perform the work. Further, in one embodiment, user interfaces generated by system 10, such as shown in FIG. 2, can be printed on paper or made available in any other "portable" media so that the information can be easily used in the field to assist in project planning.

Thus, a task progress update history visualization system is provided that can display, or otherwise visually depict, task progress update history within a user interface. This allows for task progress update history for all the tasks in a project plan to be viewed within a single user interface. This can make it easier to identify and correct task progress updated errors, or other potential mistakes in reporting task progress. Further, the display of task progress update history does not comprise any of the existing display features of a project plan management system, such as a display of a task's planned start, planned finish, actual start, actual finish, current progress, duration, etc. Even further, the task progress update history visualization system can provide a visual progress reporting capability and a visual editing capability.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to visualize task progress update history, the visualizing comprising:
displaying a project plan timeline within a user interface, wherein the project plan timeline comprises one or more tasks indicators that visually represent one or more tasks and a timeline comprising one or more time unit indicators that visually represent one or more time units; and
displaying, within the project timeline, a task progress update history comprising a plurality of task progress update indicators, wherein the task progress update indicators comprise displayed lines that visually represent a plurality of task progress updates, wherein,
the displayed lines comprising the task progress update indicators visually indicate a date and time of the task progress updates and task progress rates reported by the task progress updates based on slopes of the displayed lines, and
a convergence of the displayed lines visually indicates a decrease in a rate of the task progress and a divergence of the displayed lines visually indicates an increase in a rate of the task progress,
receiving a user interaction comprising a selection of a part of one of the displayed lines, wherein the user interaction comprises a selection of an origin point or an endpoint of the line, a drag of the selected part to a new location on the user interface, and a drop of the selected part of the line;
dynamically updating the displayed task progress update history, wherein
the display of the line with the selected part is dynamically updated such that the origin point or endpoint is moved to reflect the user interaction and the date and time of the task progress update of the line with the selected part is dynamically updated based on the user interaction, and
the displaying of the project plan timeline and task progress update history comprises a component of software functionality within a multi-functional enterprise project portfolio management software suite.

2. The computer-readable medium of claim 1,
wherein a task indicator comprises a rectangle;
wherein a first edge of the rectangle represents a start date and time of a task represented by the task indicator;
wherein a second edge of the rectangle represents a finish date and time of the task represented by the task indicator;
wherein the displayed line for a task progress update indicator comprises an arrow;
wherein the arrow is displayed within the rectangle;
wherein the arrow originates within the first edge at an origination point that represents the date and time of the task progress update; and
where the arrow terminates within the second edge at a termination point that represents the task progress reported by the task progress update.

3. The computer-readable medium of claim 2, wherein,
the selected part of the displayed line comprises the origination point of the arrow and the user interaction comprises a first user interaction that is a drag of the origination point of the arrow of the line with the selected part to a to a new point within the first edge;
the date and time of the task progress update of the line with the selected part is modified based on the first user interaction;
a second user interaction is received that comprises a second selection of a termination point of the arrow of a displayed line and a drag of the termination point of the arrow of the line to a new point within the second edge; and
the task progress reported by the task progress update of the line with the selected second part is modified based on the second user interaction.

4. The computer-readable medium of claim 2, the visualizing further comprising extending the first edge and the second edge of the rectangle;
  wherein an original portion of the first edge and the second edge is displayed using a solid line;
  wherein an extended portion of the first edge and the second edge is displayed using a dashed line; and
  wherein the origination point is within the extended portion of the first edge.

5. The computer-readable medium of claim 2, wherein a slope of the arrow visually indicates a rate of the task progress.

6. The computer-readable medium of claim 5, wherein an intersection of arrows visually indicates a correction of at least one task progress update of the one or more task progress updates.

7. The computer-readable medium of claim 1, the visualizing comprising causing at least one time unit indicator not to be displayed within the user interface.

8. The computer-readable medium of claim 1, wherein the displayed task progress update history visually represents all task progress updates for all tasks of the one or more tasks.

9. A computer-implemented method for visualizing task progress update history, the computer-implemented method comprising:
  displaying a project plan timeline within a user interface, wherein the project plan timeline comprises one or more tasks indicators that visually represent one or more tasks and a timeline comprising one or more time unit indicators that visually represent one or more time units; and
  displaying, within the project timeline, a task progress update history comprising a plurality of task progress update indicators, wherein the task progress update indicators comprise displayed lines that visually represent a plurality of task progress updates, wherein,
    the displayed lines comprising the task progress update indicators visually indicate a date and time of the task progress updates and the task progress rates reported by the task progress updates based on slopes of the displayed lines, and
    a convergence of the displayed lines visually indicates a decrease in a rate of the task progress and a divergence of the displayed lines visually indicates an increase in a rate of the task progress,
  receiving a user interaction comprising a selection of a part of one of the displayed lines, wherein the user interaction comprises a selection of an origin point or an endpoint of the line, a drag of the selected part to a new location on the user interface, and a drop of the selected part of the line; and
  dynamically updating the displayed task progress update history, wherein
    the display of the line with the selected part is dynamically updated such that the origin point or endpoint is moved to reflect the user interaction and the date and time of the task progress update of the line with the selected part is dynamically updated based on the user interaction, and
    the displaying of the project plan timeline and task progress update history comprises a component of software functionality within a multi-functional enterprise project portfolio management software suite.

10. The computer-implemented method of claim 9, wherein a task indicator comprises a rectangle;
  wherein a first edge of the rectangle represents a start date and time of a task represented by the task indicator;
  wherein a second edge of the rectangle represents a finish date and time of the task represented by the task indicator;
  wherein the displayed line for a task progress update indicator comprises an arrow;
  wherein the arrow is displayed within the rectangle;
  wherein the arrow originates within the first edge at an origination point that represents the date and time of the task progress update; and
  where the arrow terminates within the second edge at a termination point that represents the task progress reported by the task progress update.

11. The computer-implemented method of claim 10, wherein,
  the selected part of the displayed line comprises the origination point of the arrow and the user interaction comprises a first user interaction that is a drag of the origination point of the arrow of the line with the selected part to a new point within the first edge;
  the date and time of the task progress update of the line with the selected part is modified based on the first user interaction;
  a second user interaction is received that comprises a second selection of a termination point of the arrow of a displayed line and a drag of the termination point of the arrow of the selected line to a new point within the second edge; and
  the task progress reported by the task progress update of the line with the selected second part is modified based on the second user interaction.

12. The computer-implemented method of claim 10, further comprising extending the first edge and the second edge of the rectangle;
  wherein an original portion of the first edge and the second edge is displayed using a solid line;
  wherein an extended portion of the first edge and the second edge is displayed using a dashed line; and
  wherein the origination point is within the extended portion of the first edge.

13. The computer-implemented method of claim 10, wherein a slope of the arrow visually indicates a rate of the task progress.

14. A system for visualizing task progress update history, the system comprising:
  a processor;
  a display device;
  memory coupled to the processor storing instructions that, when executed, configure the processor to:
    display, on the display device, a project plan timeline within a user interface, wherein the project plan timeline comprises one or more tasks indicators that visually represent one or more tasks and a timeline comprising one or more time unit indicators that visually represent one or more time units; and
    display, within the project timeline, a task progress update history comprising a plurality of task progress update indicators, wherein the task progress update indicators comprise displayed lines that visually represent a plurality of task progress updates, wherein
      the displayed lines comprising the task progress update indicators visually indicate a date and time of the task progress updates and task progress rates reported by the task progress updated based on slopes of the displayed lines, and
      a convergence of the displayed lines visually indicates a decrease in a rate of the task progress and a divergence of the displayed lines visually indicates an increase in a rate of the task progress, receive a user interaction comprising a selection of a part of one of the displayed lines, wherein the user interaction comprises a selection of an origin point or an endpoint of the line, a drag of the selected part to a new location on the user interface, and a drop of the selected part of the line; and dynamically update the displayed task progress update history, wherein, the display of the line with the selected part is dynamically updated such that the origin point or endpoint is moved to reflect the user interaction and the date and time of the task progress update of the line with the selected part is dynamically updated based on the user interaction, and the displaying of the project plan timeline and task progress update history comprises a component of software functionality within a multi-functional enterprise project portfolio management software suite.

15. The system of claim 14, wherein a task indicator comprises a rectangle;

wherein a first edge of the rectangle represents a start date and time of a task represented by the task indicator;

wherein a second edge of the rectangle represents a finish date and time of the task represented by the task indicator;

wherein the displayed line for a task progress update indicator comprises an arrow;

wherein the arrow is displayed within the rectangle;

wherein the arrow originates within the first edge at an origination point that represents the date and time of the task progress update; and where the arrow terminates within the second edge at a termination point that represents the task progress reported by the task progress update.

16. The system of claim 15, wherein the selected part of the displayed line comprises the origination point of the arrow and the user interaction comprises a first user interaction that is a drag of the origination point of the arrow for the line with the selected part to a new point within the first edge; and the date and time of the task progress update of the line with the selected part is modified based on the first user interaction;

a second user interaction is received for the selected line that comprises a second selection of a termination point of the arrow of a displayed line and a drag of the termination point of the arrow of the line to a new point within the second edge; and the task progress reported by the task progress update of the line with the selected second part is modified based on the second user interaction.

17. The system of claim 15, wherein the instructions further configure the processor to: extend the first edge and the second edge of the rectangle;

wherein an original portion of the first edge and the second edge is displayed using a solid line;

wherein an extended portion of the first edge and the second edge is displayed using a dashed line; and wherein the origination point is within the extended portion of the first edge.

18. The system of claim 15, wherein a slope of the arrow visually indicates a rate of the task progress.

19. The computer readable medium of claim 1, wherein the task progress update history visualizes task progress history for all tasks of a project plan within a single user interface.

20. The system of claim 14, wherein the processor, display device, and memory comprise a specialized project management system that provides project management functionality for the multi-functional enterprise project portfolio management software suite.

\* \* \* \* \*

UNITED STATES PATENT AND TRADEMARK OFFICE
CERTIFICATE OF CORRECTION

PATENT NO. : 10,643,157 B2  
APPLICATION NO. : 14/612322  
DATED : May 5, 2020  
INVENTOR(S) : De et al.

Page 1 of 1

It is certified that error appears in the above-identified patent and that said Letters Patent is hereby corrected as shown below:

On the Title Page

On page 2, Column 2, item (56) under Other Publications, Line 1, delete "informatin" and insert -- information --, therefor.

On page 2, Column 2, item (56) under Other Publications, Line 25, delete "Czamigowska," and insert -- Czarnigowska, --, therefor.

On page 2, Column 2, item (56) under Other Publications, Line 34, delete "planing" and insert -- planning --, therefor.

In the Specification

In Column 5, Line 1, after "can" insert -- be --.

In the Claims

In Column 20, Line 56, in Claim 3, delete "to a to a" and insert -- to a --, therefor.

In Column 24, Line 29, in Claim 19, delete "computer readable" and insert -- computer-readable --, therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*